(12) United States Patent
Dawkins et al.

(10) Patent No.: US 6,820,207 B2
(45) Date of Patent: Nov. 16, 2004

(54) METHOD FOR REBOOTING ONLY A SPECIFIC LOGICAL PARTITION IN A DATA PROCESSING SYSTEM AS PER A REQUEST FOR REBOOT

(75) Inventors: George John Dawkins, Austin, TX (US); Van Hoa Lee, Cedar Park, TX (US); Kanisha Patel, Cedar Park, TX (US); Peter Dinh Phan, Austin, TX (US); David R. Willoughby, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 646 days.

(21) Appl. No.: 09/798,167

(22) Filed: Mar. 1, 2001

(65) Prior Publication Data

US 2002/0124194 A1 Sep. 5, 2002

(51) Int. Cl.[7] ................................................. G06F 1/26
(52) U.S. Cl. ........................................ 713/324; 713/310
(58) Field of Search ................................. 713/310, 324

(56) References Cited

U.S. PATENT DOCUMENTS

| | | | | |
|---|---|---|---|---|
| 4,564,903 A | | 1/1986 | Guyette et al. | 364/300 |
| 4,809,163 A | | 2/1989 | Hirosawa et al. | 364/200 |
| 4,843,541 A | | 6/1989 | Bean et al. | 364/200 |
| 5,345,590 A | | 9/1994 | Ault et al. | 395/650 |
| 5,564,040 A | | 10/1996 | Kubala | 395/497.04 |
| 5,717,942 A | * | 2/1998 | Haupt et al. | 712/13 |
| 6,304,929 B1 | * | 10/2001 | Wallach et al. | 710/302 |
| 6,647,508 B2 | * | 11/2003 | Zalewski et al. | 714/3 |

FOREIGN PATENT DOCUMENTS

| | | | | |
|---|---|---|---|---|
| EP | 0 474 059 A2 | 3/1992 | | G06F/9/44 |
| WO | WO 01/09720 | 2/2001 | | G06F/9/46 |

OTHER PUBLICATIONS

IBM Technical Disclosure Bulletin, vol. 39, No. 12, Dec. 1996, "Hypervisor High Performance Synchronous Dispatch for Coupled Systems", one page.

IBM Technical Disclosure Bulletin, vol. 38, No. 04, Apr. 1995, "VM MPG Operating as a DRF Hypervisor as a First Level Guest Under PR/SM", p. 325.

IBM Technical Disclosure Bulletin, vol. 36, No. 03, Mar. 1993, "Sharing Read–Only Memory among Multiple Logical Partitions", pp. 303–304.

IBM Technical Disclosure Bulletin, vol. 39, No. 12, Dec. 1996, "Highly Parallel Coupling Facility Emulator/Router with Shadowed Link Buffers", 2 pages.

IBM Technical Disclosure Bulletin, vol. 39, No. 06, Jun. 1996, "Coordinating Multiple Server Partitions to Enter Power–Save State", pp. 235–239.

* cited by examiner

Primary Examiner—Thomas Lee
Assistant Examiner—P Chandrasekhar
(74) Attorney, Agent, or Firm—Duke W. Yee; Mark E. McBurney; Wayne P. Bailey

(57) ABSTRACT

A method, apparatus, and computer implemented instructions for controlling power in a data processing system having a plurality of logical partitions. Responsive to receiving a request to turn off the power for a logical partition within the plurality of logical partitions in the data processing system, a determination is made as to whether an additional partition within the plurality of logical partitions is present in the data processing system. The power is turned off in the data processing system in response to a determination an additional partition within the plurality of logical partitions is absent in the data processing system. The logical partition is shut down in response to a determination that an additional partition within the plurality of logical partitions is present in the data processing system. The mechanism of the present invention also provides for rebooting logical partitions. A request is received to reboot a logical partition within the plurality of logical partitions. A reset signal is activated only for each processor assigned to the logical partition.

24 Claims, 7 Drawing Sheets

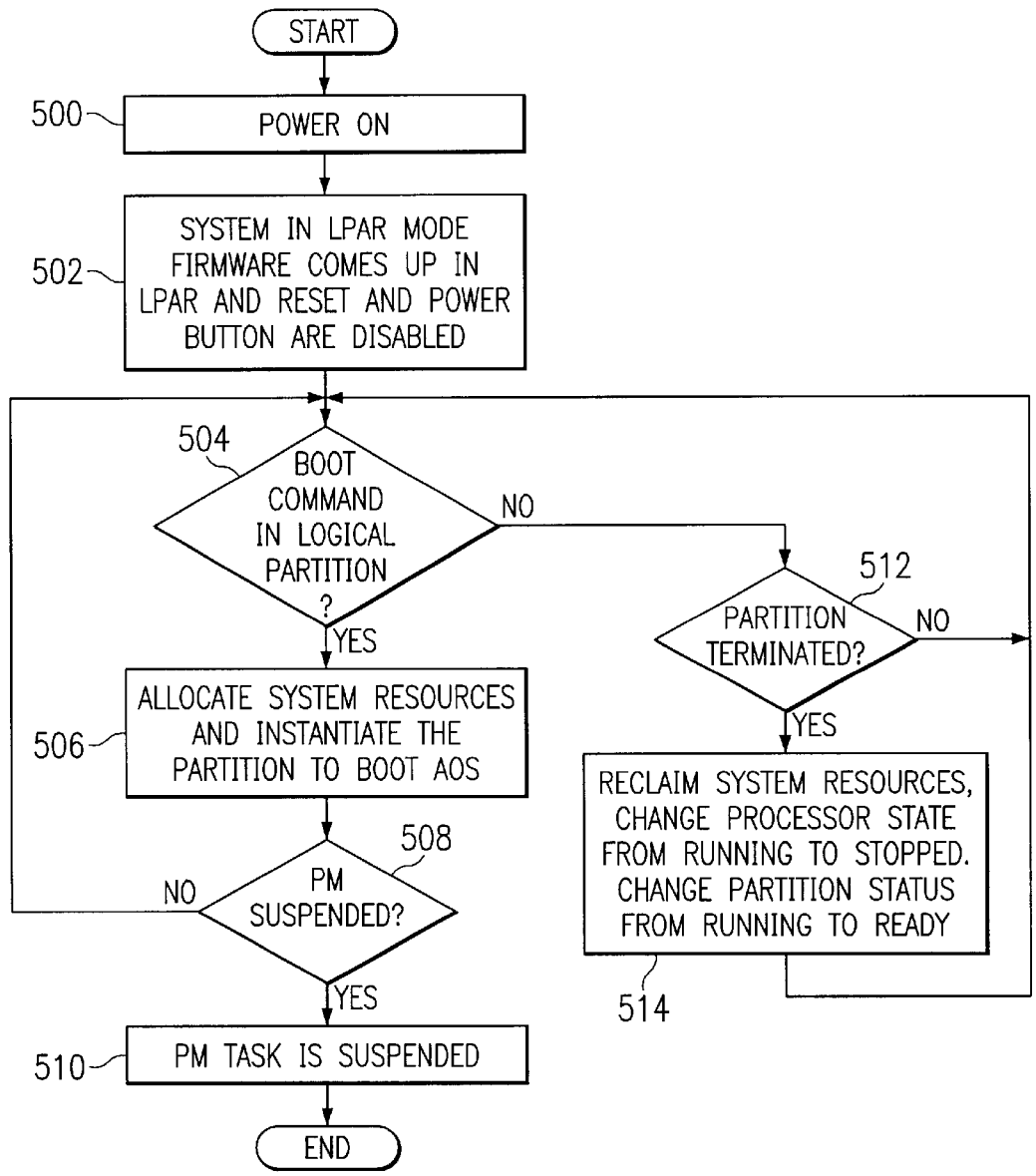

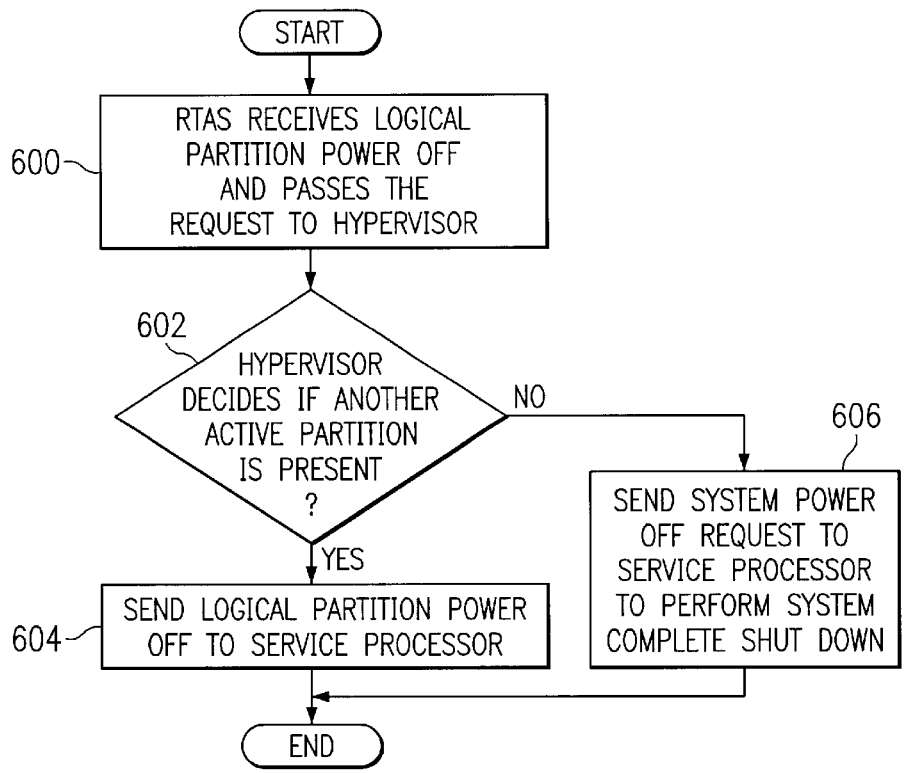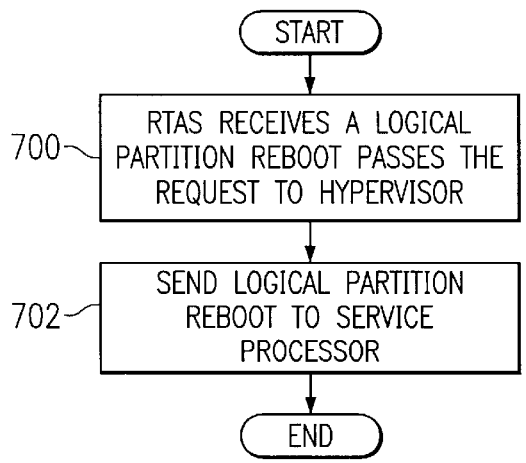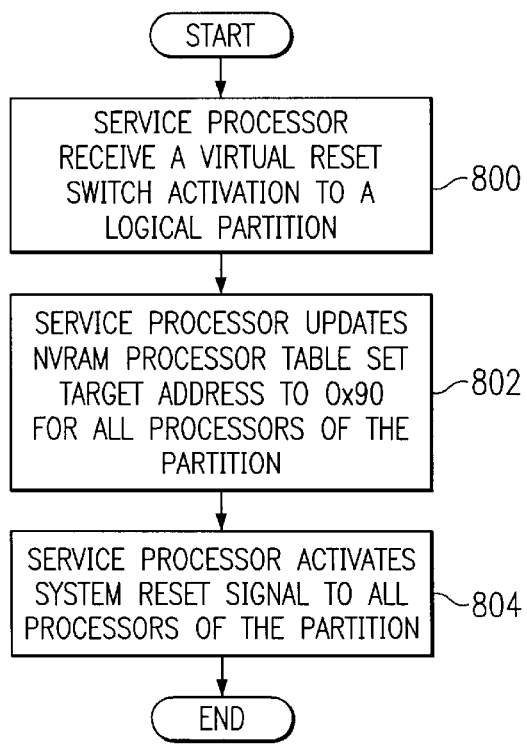

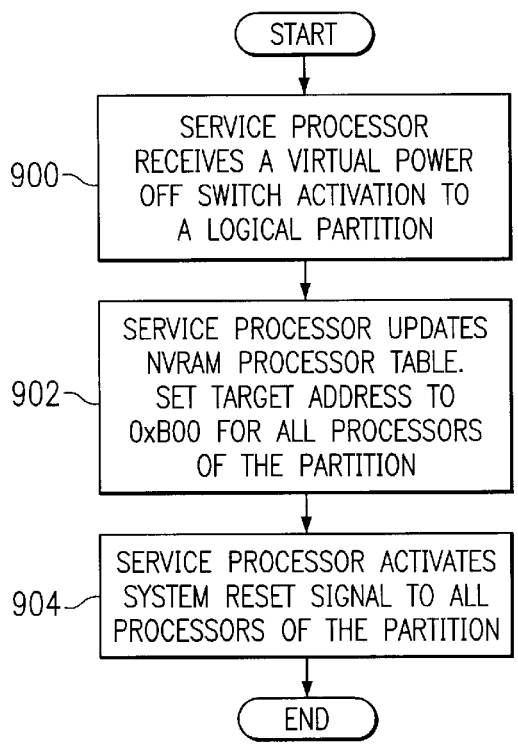
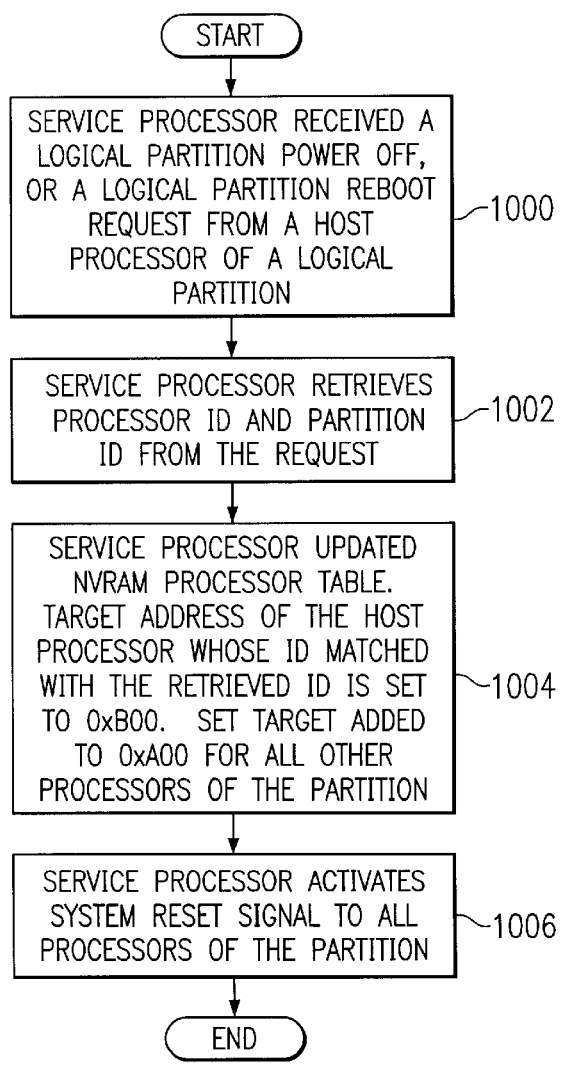

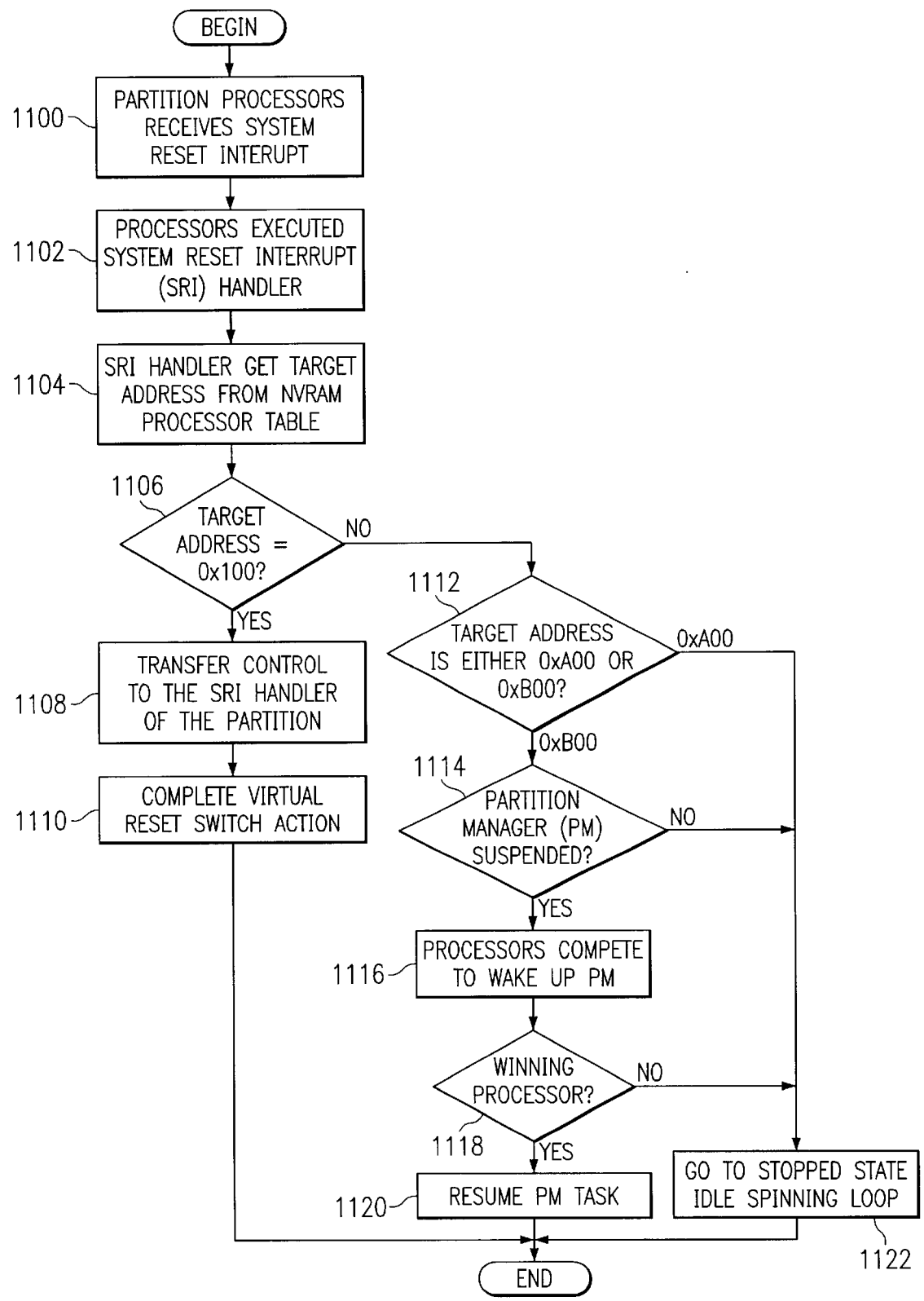

METHOD FOR REBOOTING ONLY A SPECIFIC LOGICAL PARTITION IN A DATA PROCESSING SYSTEM AS PER A REQUEST FOR REBOOT

BACKGROUND OF THE INVENTION

1. Technical Field

The present invention relates generally to an improved data processing system and in particular to a method and apparatus for managing data in a network data processing system. Still more particularly, the present invention provides a method and apparatus for maintaining profiles used to configure a data processing system.

2. Description of Related Art

A logical partitioning option (LPAR) within a data processing system (platform) allows multiple copies of a single operating system (OS) or multiple heterogeneous operating systems to be simultaneously run on a single data processing system platform. A partition, within which an operating system image runs, is assigned a non-overlapping sub-set of the platform's resources. These platform allocable resources include one or more architecturally distinct processors with their interrupt management area, regions of system memory, and I/O adapter bus slots. The partition's resources are represented by its own open firmware device tree to the OS image.

Each distinct OS or image of an OS running within the platform are protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an OS's allocated resources are prevented from affecting the resources of any other image. Thus, each image of the OS (or each different OS) directly controls a distinct set of allocable resources within the platform.

The configuration of these different partitions are typically managed through a terminal, such as a hardware system console (HSC). These terminals use objects, also referred to as profiles that are defined and modified in HSC. The profiles are used to configure LPARs within the data processing system. Multiple HSCs may be present and used for maintaining and configuring LPARs in the data processing system. These profiles used to configure the data processing system in LPARs are often required to be accessible to any HSC that is in communication with the data processing system. Maintaining profiles between these HSCs are often difficult and require processes for maintaining synchronization of the profiles at each HSC. Therefore, it would be advantageous to have improved method, apparatus, and computer implemented instructions for maintaining profiles for different HSCs.

With multiple partitions executing at the same time, a command to reset the data processing system will reset all the partitions. Similarly, pressing a reset button on the data processing system also will cause all of the partitions to reset. Further, turning off the power to the system may result in errors if all of the logical partitions have not been properly shut down. With these situations, the physical buttons for power and reset on a computer should not be used in a system using logical partitions.

Therefore, it would be advantageous to have an improved method and apparatus for resetting and/or turning off power to a data processing system.

SUMMARY OF THE INVENTION

The present invention provides a method, apparatus, and computer implemented instructions for controlling power in a data processing system having a plurality of logical partitions. Responsive to receiving a request to turn off the power for a logical partition within the plurality of logical partitions in the data processing system, a determination is made as to whether an additional partition within the plurality of logical partitions is present in the data processing system. The power is turned off in the data processing system in response to a determination an additional partition within the plurality of logical partitions is absent in the data processing system. The logical partition is shut down in response to a determination that an additional partition within the plurality of logical partitions is present in the data processing system. The mechanism of the present invention also provides for rebooting logical partitions. A request is received to reboot a logical partition within the plurality of logical partitions. A reset signal is activated only for each processor assigned to the logical partition.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart of a process used for controlling power and rebooting logical partitions in accordance with a preferred embodiment of the present invention;

FIG. 6 is a flowchart of a process used for shutting down a partition in accordance with a preferred embodiment of the present invention;

FIG. 7 is a flowchart of a process used for rebooting a logical partition in accordance with a preferred embodiment of the present invention;

FIG. 8 is a flowchart of a process used for resetting a logical partition in accordance with a preferred embodiment of the present invention;

FIG. 9 is a flowchart of a process used for turning off power to a partition in accordance with a preferred embodiment of the present invention;

FIG. 10 is a flowchart of a process used for resetting processors in accordance with a preferred embodiment of the present invention; and FIG. 11 is a flowchart of a process used for handling a system reset interrupt in accordance with a preferred embodiment of the present invention.

DETAILED DESCRIPTION OF THE PREFERRED EMBODIMENT

Figure 1:
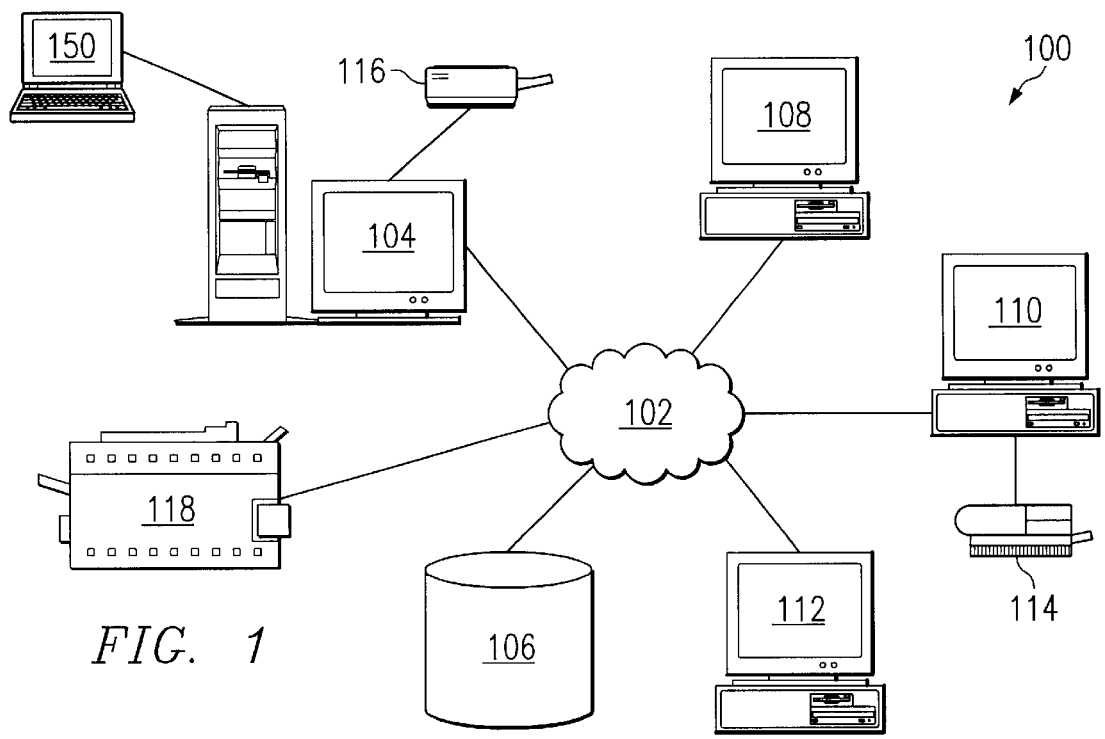
FIG. 1 is a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to hardware system console 150. Server 104 is also connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network. In the depicted example, server 104 is a logically partitioned platform and provides data, such as boot files, operating system images and applications, to clients 108–112. Hardware system console 150 may be a laptop computer and is used to display messages to an operator from each operating system image running on server 104, as well as to send input information, received from the operator, to server 104. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients, such as client 108 and client 112, do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet or a local area network.

FIG. 1 is intended as an example and hot as an architectural limitation for the processes of the present invention.

Figure 2:
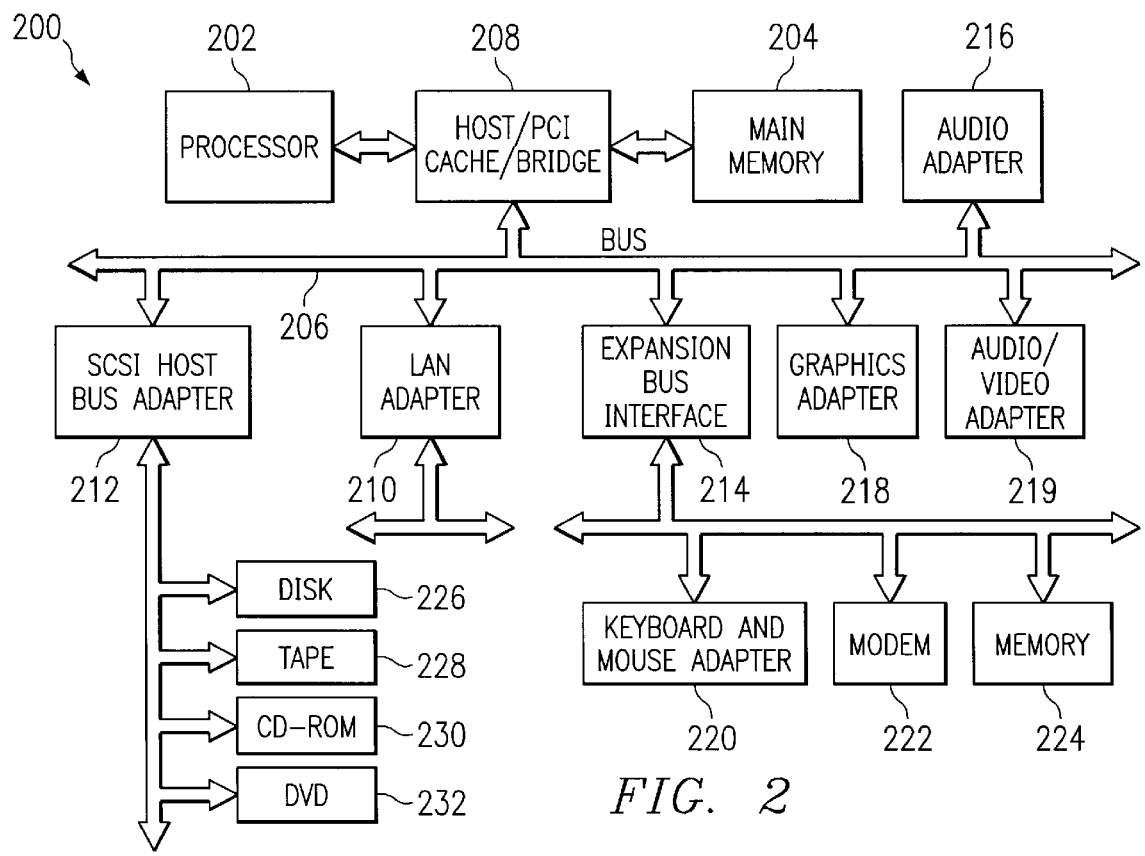
FIG. 2 is a block diagram of a data processing system in accordance with the present invention.

With reference now to FIG. 2, a block diagram of a data processing system in accordance with the present invention is illustrated. Data processing system 200 is an example of a client or a hardware system console, such as hardware system console 150 depicted in FIG. 1. Data processing system 200 employs a peripheral component interconnect (PCI) local bus architecture. Although the depicted example employs a PCI bus, other bus architectures, such as Micro Channel and ISA, may be used. Processor 202 and main memory 204 are connected to PCI local bus 206 through PCI bridge 208. PCI bridge 208 may also include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. In the depicted example, SCSI host bus adapter 212 provides a connection for hard disk drive 226, tape drive 228, CD-ROM drive 230, and digital video disc read only memory drive (DVD-ROM) 232. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as OS/2, which is available from International Business Machines Corporation. "OS/2" is a trademark of International Business Machines Corporation. An object-oriented programming system, such as Java, may run in conjunction with the operating system, providing calls to the operating system from Java programs or applications executing on data processing system 200. Instructions for the operating system, the object-oriented operating system, and applications or programs are located on a storage device, such as hard disk drive 226, and may be loaded into main memory 204 for execution by processor 202.

Those of ordinary skill in the art will appreciate that the hardware in FIG. 2 may vary depending on the implementation. For example, other peripheral devices, such as optical disk drives and the like, may be used in addition to or in place of the hardware depicted in FIG. 2. The depicted example is not meant to imply architectural limitations with respect to the present invention. For example, the processes of the present invention may be applied to multiprocessor data processing systems.

Figure 3:
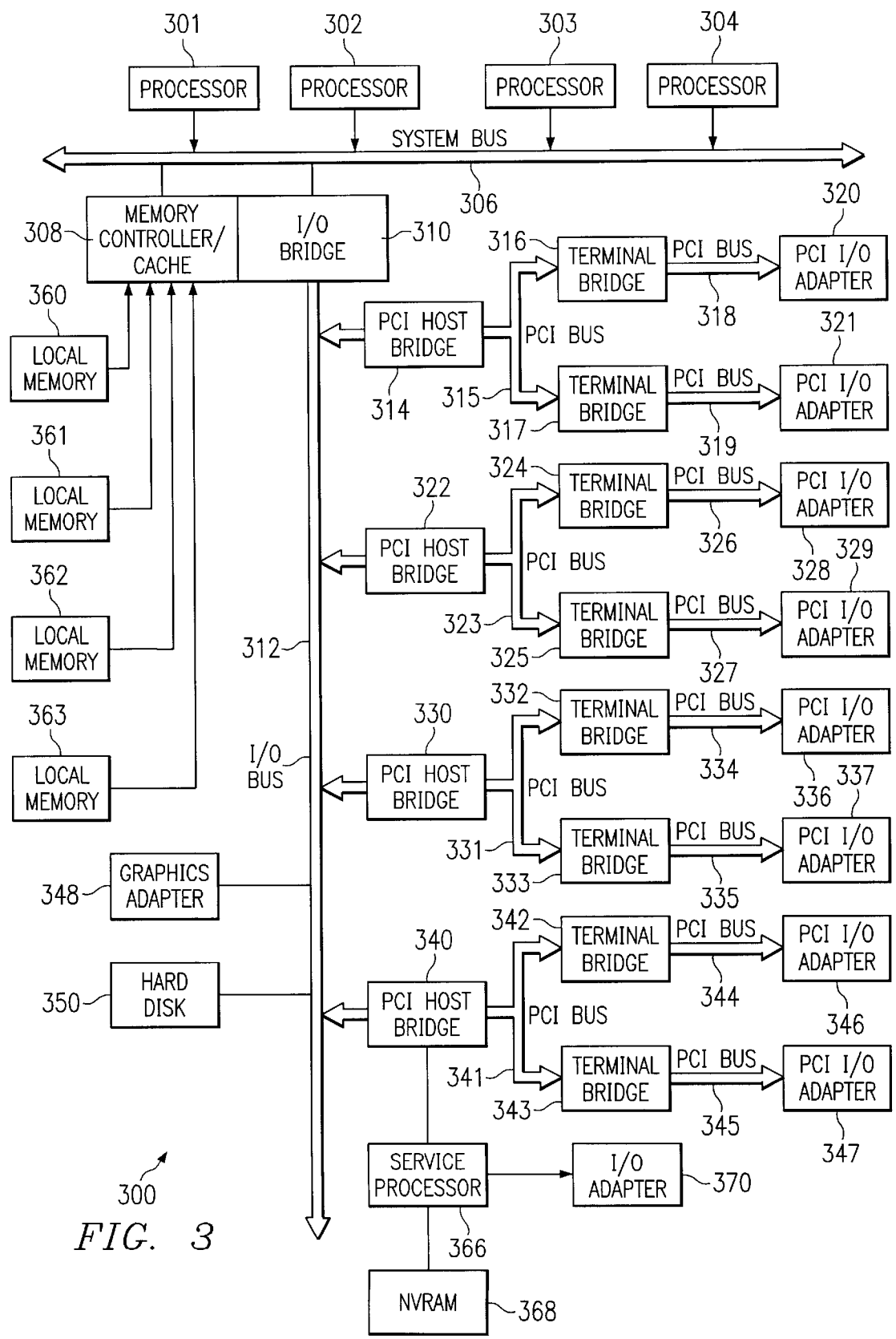
FIG. 3 is a block diagram of a data processing system, which may be implemented as a logically partitioned server.

With reference now to FIG. 3, a block diagram of a data processing system, which may be implemented as a logically partitioned server, such as server 104 in FIG. 1, is depicted in accordance with the present invention. Data processing system 300 may be a symmetric multiprocessor (SMP) system including a plurality of processors 301, 302, 303, and 304 connected to system bus 306. For example, data processing system 300 may be an IBM RS/6000, a product of International Business Machines Corporation in Armonk, N.Y. Alternatively, a single processor system may be employed. Also connected to system bus 306 is memory controller/cache 308, which provides an interface to a plurality of local memories 360–363. I/O bus bridge 310 is connected to system bus 306 and provides an interface to I/O bus 312. Memory controller/cache 308 and I/O bus bridge 310 may be integrated as depicted.

Data processing system 300 is a logically partitioned data processing system. Thus, data processing system 300 may have multiple heterogeneous operating systems (or multiple instances of a single operating system) running simultaneously. Each of these multiple operating systems may have any number of software programs executing within in it. Data processing system 300 is logically partitioned such that different I/O adapters 320–321, 328–329, 336–337, and 346–347 may be assigned to different logical partitions.

Thus, for example, suppose data processing system 300 is divided into three logical partitions, P1, P2, and P3. Each of I/O adapters 320–321, 328–329, and 336–337, each of processors 301–304, and each of local memories 360–364 is assigned to one of the three partitions. For example, processor 301, memory 360, and I/O adapters 320, 328, and 329 may be assigned to logical partition P1; processors 302–303, memory 361, and I/O adapters 321 and 337 may be assigned to partition P2; and processor 304, memories 362–363, and I/O adapters 336 and 346–347 may be assigned to logical partition P3.

Each operating system executing within data processing system 300 is assigned to a different logical partition. Thus, each operating system executing within data processing system 300 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000™ operating system may be operating within logical partition P1. Windows 2000 is a product and trademark of Microsoft Corporation of Redmond, Wash.

Peripheral component interconnect (PCI) Host bridge 314 connected to I/O bus 312 provides an interface to PCI local bus 315. A number of Terminal Bridges 316–317 may be connected to PCI bus 315. Typical PCI bus implementations will support four Terminal Bridges for providing expansion slots or add-in connectors. Each of Terminal Bridges 316–317 is connected to a PCI I/O adapter 320–321 through a PCI Bus 318–319. Each I/O adapter 320–321 provides an interface between data processing system 300 and input/output devices such as, for example, other network computers, which are clients to server 300. Only a single I/O adapter 320–321 may be connected to each terminal bridge 316–317. Each of terminal bridges 316–317 is configured to prevent the propagation of errors up into the PCI Host Bridge 314 and into higher levels of data processing system 300. By doing so, an error received by any of terminal bridges 316–317 is isolated from the shared buses 315 and 312 of the other I/O adapters 321, 328–329, and 336–337 that may be in different partitions. Therefore, an error occurring within an I/O device in one partition is not "seen" by the operating system of another partition. Thus, the integrity of the operating system in one partition is not effected by an error occurring in another logical partition. Without such isolation of errors, an error occurring within an I/O device of one partition may cause the operating systems or application programs of another partition to cease to operate or to cease to operate correctly.

Additional PCI host bridges 322, 330, and 340 provide interfaces for additional PCI buses 323, 331, and 341. Each of additional PCI buses 323, 331, and 341 are connected to a plurality of terminal bridges 324–325, 332–333, and 342–343, which are each connected to a PCI I/O adapter 328–329, 336–337, and 346–347 by a PCI bus 326–327, 334–335, and 344–345. Thus, additional I/O devices, such as, for example, modems or network adapters may be supported through each of PCI I/O adapters 328–329, 336–337, and 346–347. In this manner, server 300 allows connections to multiple network computers. A memory mapped graphics adapter 348 and hard disk 350 may also be connected to I/O bus 312 as depicted, either directly or indirectly.

Management of logical partitions is achieved through terminals, such as hardware system consoles (HSC). This access is provided in these examples through service processor 366, nonvolatile random access memory (NVRAM) 368, and input/output (I/O) adapter 370. HSCs connect to service processor 366 through I/O adapter 370. NVRAM 368 contains objects, such as profiles used to configure and manage logical partitions within data processing system 300. In these examples, the profiles stored in NVRAM 368 are sent to HSCs as they come online or connect to data processing system 300 through I/O adapter 370. This architecture provides a mechanism to avoid having to store profiles for logical partitions at the HSCs. Further, synchronization mechanisms to maintain profiles duplicated at different HSCs also are not required with this architecture.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

Figure 4:
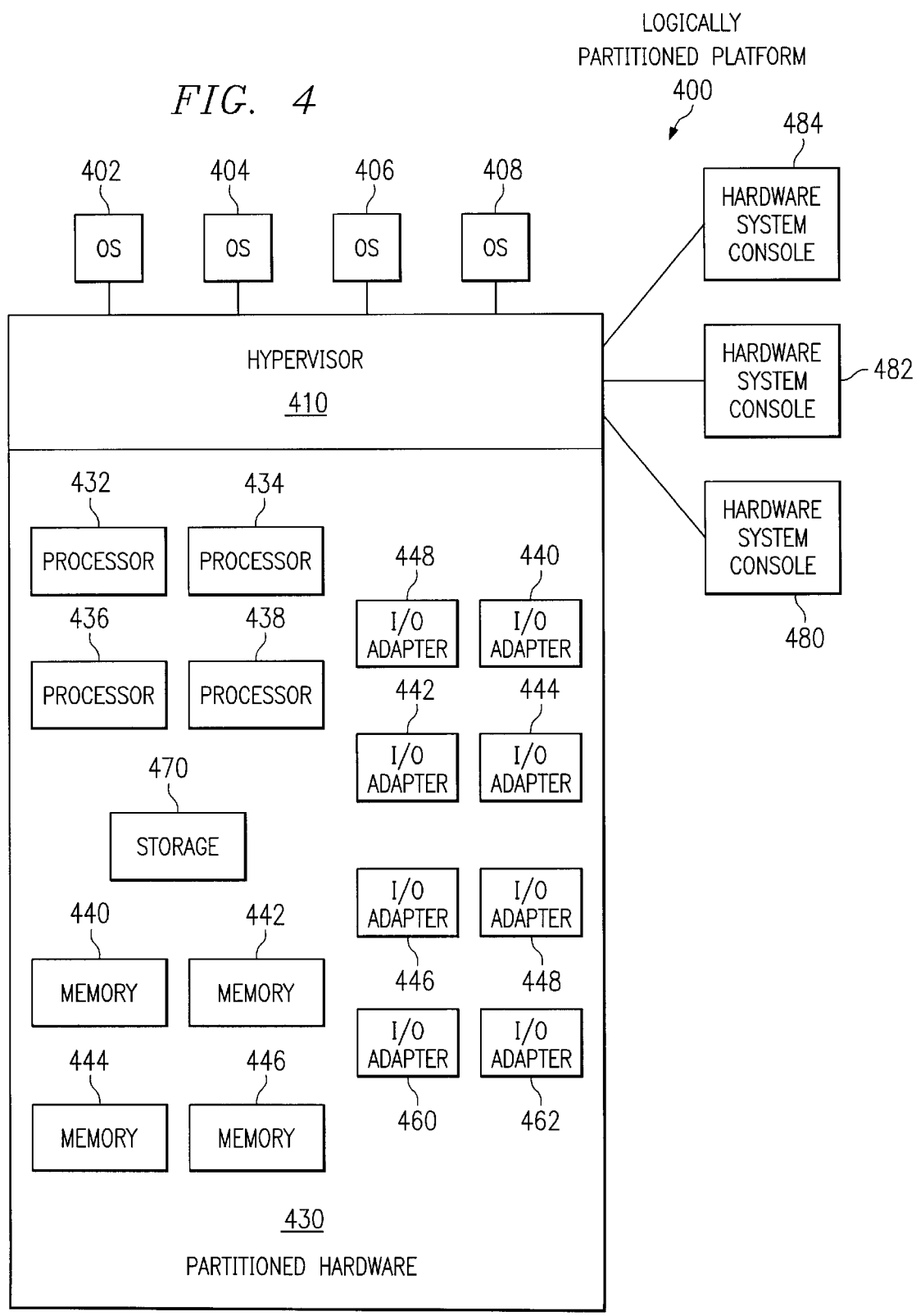
FIG. 4 is a block diagram of an exemplary logically partitioned platform in which the present invention may be implemented.

With reference now to FIG. 4, a block diagram of an exemplary logically partitioned platform is depicted in which the present invention may be implemented. The hardware in logically partitioned platform 400 may be implemented as, for example, server 300 in FIG. 3. Logically partitioned platform 400 includes partitioned hardware 430, hypervisor 410, and operating systems 402–408. Operating systems 402–408 may be multiple copies of a single operating system or multiple heterogeneous operating systems simultaneously run on platform 400.

Partitioned hardware 430 includes a plurality of processors 432–438, a plurality of system memory units 440–446, a plurality of input/output (I/O) adapters 448–462, and a storage unit 470. Each of the processors 432–438, memory units 440–446, and I/O adapters 448–462 may be assigned to one of multiple partitions within logically partitioned platform 400, each of which corresponds to one of operating systems 402–408.

Hypervisor 410, implemented as firmware, performs a number of functions and services for operating system images 402–408 to create and enforce the partitioning of logically partitioned platform 400. Firmware is "hard software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Hypervisor 410 provides a secure direct memory access (DMA) window, per I/O adapter, such as, for example, I/O adapter 328 in FIG. 3, on a shared I/O bus, such as, for example, I/O bus 312 in FIG. 3, into the memory resources allocated to its associated OS image, such as, for example, OS image 402 in FIG. 4. The secure DMA window provides access from an I/O adapter to memory which is allocated to the same partition as the I/O adapter, while preventing the I/O adapter from getting access to the memory allocated to a different partition.

In one embodiment, as implemented within an RS/6000 Platform Architecture, the hypervisor makes use of two existing hardware mechanisms. These hardware mechanisms are called the translation control entry (TCE) facility and the DMA range register facility bridge. In one embodiment, the TCE facility is implemented in the PCI Host Bridge, such as PCI Host Bridges 314, 322, 330, and 340 in FIG. 3, and the range register facility is implemented in the Terminal Bridge, such as Terminal Bridges 316–317, 324–325, 332–333, and 342–343.

The TCE facility (not shown) is a facility for the I/O which is analogous to the virtual memory address translation facility provided by most processors today. That is, the TCE facility provides a mechanism to translate a contiguous address space on the I/O bus to a different and possibly noncontiguous address space in memory. It does this in a manner similar to the processor's translation mechanism, and thus breaks the address space of the memory and the address space of the I/O bus into small chunks, called pages. For IBM PowerPC processor based platforms, this size is generally 4 Kbytes per page. Associated with each page is a translation and control entry. This translation and control entry is called a TCE for this I/O translation mechanism, and is sometimes called the Page Table Entry for the corresponding processor virtual translation mechanism. These translation entries are in different tables for the processor and I/O.

When an I/O operation starts on the bus, the TCE facility accesses the entry for that page in the TCE table, and uses the data in that entry as the most significant bits of the address to access memory, with the least significant bits being taken from the I/O address on the bus. The number of bits used from the bus is dependent on the size of the page, and is the number of bits necessary to address to the byte level within the page (e.g., for the 4 Kbyte page size example, the number of bits taken from the bus would be 12, as that is the number of bits required to address to the byte level within the 4 Kbyte page). Thus, the TCE provides bits to determine which page in memory is addressed, and the address bits taken from the I/O bus determines the address within the page.

The bus address ranges that the I/O adapters are allowed to place onto the I/O bus are limited by the range register facility. The range register facility contains a number of registers that hold addresses that are compared to what the I/O adapter is trying to access. If the comparison shows that the I/O adapter is trying to access outside of the range of addresses that were programmed into the range registers by the firmware, then the bridge will not respond to the I/O adapter, effectively blocking the I/O adapter from accessing addresses that it is not permitted to access. In this embodiment, these two hardware mechanisms are placed under the control of the hypervisor.

When platform 400 is initialized, a disjoint range of I/O bus DMA addresses is assigned to each of I/O adapters 448–462 for the exclusive use of the respective one of I/O adapters 448–462 by hypervisor 410. Hypervisor 410 then configures the terminal bridge range register (not shown) facility to enforce this exclusive use. Hypervisor 410 then communicates this allocation to the owning one of OS images 402–408. Hypervisor also initializes all entries in a particular I/O adapter's associated section of the TCE table to point to a reserved page per image that is owned by the OS image that is allocated to that I/O adapter, such that unauthorized accesses to memory by an I/O adapter will not create an error that could affect one of the other OS images 402–408.

When an owning one of OS images 402–408 requests to map some of its memory for a DMA operation, it makes a call to the hypervisor 410 including parameters indicating the I/O adapter, the memory address range, and the associated I/O bus DMA address range to be mapped. The hypervisor 410 checks that the I/O adapter and the memory address range are allocated to the owning one of OS images 402–408. The hypervisor 410 also checks that the I/O bus DMA range is within the range allocated to the I/O adapter. If these checks are passed, the hypervisor 410 performs the requested TCE mapping. If these checks are not passed, the hypervisor rejects the request.

Hypervisor 410 also may provide the OS images 402–408 running in multiple logical partitions each a virtual copy of a console and operator panel. The interface to the console is changed from an asynchronous teletype port device driver, as in the prior art, to a set of hypervisor firmware calls that emulate a port device driver. The hypervisor 410 encapsulates the data from the various OS images onto a message stream that is transferred to a terminal, such as hardware system console computer 480. In these examples, multiple hardware system consoles are supported. As illustrated, hardware system console 482 and hardware system console 484 also are present.

Hardware system consoles 480–484 are connected directly to logically partitioned platform 400, as illustrated in FIG. 4, or may be connected to logically partitioned platform through a network, such as, for example, network 102 in FIG. 1. These hardware system consoles may be, for example, a desktop computer, a laptop computer, or any other terminal and may be implemented as using data processing system 200 in FIG. 2. Hardware system console 480 decodes the message stream and displays the information from the various OS images 402–408 in separate windows, at least one per OS image. Similarly, keyboard input information from the operator is packaged by the hardware system console, sent to logically partitioned platform 400 where it is decoded and delivered to the appropriate OS image via the hypervisor 410 emulated port device driver associated with the then active window on the hardware system console 480. Hypervisor 410 may also perform other functions and services.

Those of ordinary skill in the art will appreciate that the hardware and software depicted in FIG. 4 may vary. For example, more or fewer processors and/or more or fewer operating system images may be used than those depicted in FIG. 4. The depicted example is not meant to imply architectural limitations with respect to the present invention.

The present invention provides a method, apparatus, and computer implemented instructions for controlling the power and rebooting logical partitions within a data processing system. The mechanism of the present invention provides functionality to turn off the power to a logical partition or to the entire system. The mechanism also provides for rebooting partitions within the data processing system. In the depicted examples, the physical power switch and reset switch are disabled within the data processing system. This disablement occurs after the data processing system powers up and executes logical partitions. A virtual power switch and virtual reset switch is provided to allow individual partitions to be turned on or off and to allow individual partitions to be rebooted.

Turning next to FIG. 5, a flowchart of a process used for controlling power and rebooting logical partitions is depicted in accordance with a preferred embodiment of the present invention. The process illustrated in FIG. 5 may be implemented in a partition manager, such as hypervisor 410 in FIG. 4. A partition manager is a process used to manage and control logical partitions within a data processing system.

The process begins by detecting the turning on of power in the data processing system (step 500). Next, the reset button and power button are disabled when the data processing system is in a LPAR mode (step 502). A determination is made as to whether a boot command is present in the logical partition (step 504). This command may be identified by reviewing or examining the contents of NVRAM 368 in FIG. 3. An HSC may place a command in this NVRAM to boot a logical partition. If the boot command is present in logical partition, system resources are allocated and the partition is instantiated to boot the operating system (step 506). In these examples, the operating system is AIX, which is available from International Business Machines Corporation.

Thereafter, a determination is then made as to whether the partition manager suspended (step 508). This step is used to determine whether more processor are to be added to the partition. For example, in a sixteen processor system, three processors may be allocated to a particular partition for exclusive use by that partition. If the partition manager suspended, the partition manager task is suspended (step 510) with the process terminating thereafter.

With reference again to step 504, if a boot command is not present for the logical partition, a determination is made as to whether a partition has been terminated (step 512). A partition may terminate if the partition is rebooted or has been shut down. If the partition terminated, system resources are reclaimed, the processor state is changed from running to stopped, and the partition status is changed from running to stopped (step 514) with the process returning to step 504.

With reference again to step 508, if the partition manager is not suspended, the process returns to step 504.

With reference again to step 512, if the partition is not terminated, the process returns to step 504.

Turning next to FIG. 6, a flowchart of a process used for shutting down a partition is depicted in accordance with a preferred embodiment of the present invention. The process illustrated in FIG. 6 may be implemented in a run time abstract service (RTAS). RTAS provides the functions for the operating system (OS) to access platform specific hardware, such as NVRAM and Real-time Clock. This service also provides hardware error reports to the partition's OS for service maintenance. RTAS is implemented as a component of the system firmware running on a logical partition. RTAS will make hypervisor calls to actually access the hardware devices and obtain hardware error reports.

The process is initiated when the partition operating system executes a shut down. This shut down is initiated by the activation of a virtual power button in the data processing system. This virtual power button may be represented as a button in a graphical user interface or as a command. In response to receiving logical partition power off request from the operating system, the request is passed to a partition manager, such as hypervisor 410 in FIG. 4 (step 600). A determination is made as to whether the hypervisor decides if another the active partition is present (step 602). If the hypervisor decides that another active partition is present, logical partition power off is sent to the service processor (step 604) with the process terminating thereafter. The service processor handles processors assigned to partitions in these examples. This includes placing the processors in a stopped state or resetting the processors.

With reference again to step 602, if the hypervisor decides that an active partition is not present, a system power off request is sent to the service processor for a complete system shut down (step 606) with the process terminating thereafter.

Turning next to FIG. 7, a flowchart of a process used for rebooting a logical partition is depicted in accordance with a preferred embodiment of the present invention. The process illustrated in FIG. 7 may be implemented in a RTAS.

The process is initiated when the partition operating system executes a shut down with a restart of the operating system. The process begins when RTAS receives logical partition reboot request from the operating system with this request being passed on to a partition manager, such as hypervisor 410 in FIG. 4 (step 700). Next, a logical partition reboot is sent to the service processor (step 702) with the process terminating thereafter.

The processes described with reference to FIGS. 8 and 9 below are for handling requests initiated from the HSC. The process, in FIG. 10, described below is for handling requests initiated from the processor of the logical partitioned data processing system.

Turning next to FIG. 8, a flowchart of a process used for resetting a logical partition is depicted in accordance with a preferred embodiment of the present invention. The process illustrated in FIG. 8 may be implemented as computer instructions executed by service processor 366 in FIG. 3.

The process begins with the service processor receiving a virtual reset switch activation to a logical partition (step 800). Next, the service processor updates NVRAM processor table set target address to 0×100 for all processors of the partition (step 802). This address points to a location to which all processors will look to after being reset. Then, the service processor activates the system reset signal to all processors of the partition (step 804) with the process terminating thereafter. Processors unassigned to or unallocated to the partition do not receive this system reset signal.

Turning next to FIG. 9, a flowchart of a process used for turning off power to a partition is depicted in accordance with a preferred embodiment of the present invention. The process illustrated in FIG. 9 may be implemented as computer instructions executed by service processor 366 in FIG. 3.

The process begins with the service processor receiving a virtual power off switch activation signal for a logical partition (step 900). The service processor updates NVRAM processor table and the target address is set to 0×B00 for all processors of the partition (step 902). This address points to a location to which all processors will look to after being reset. Next, the service processor activates the system reset signal to all processors of the partition for which power is being turned off (step 904) with the process terminating thereafter.

Turning next to FIG. 10, a flowchart of a process used for resetting processors is depicted in accordance with a preferred embodiment of the present invention. The process illustrated in FIG. 10 may be implemented as a set of computer instructions executed by service processor 366 in FIG. 3.

The process begins with the service processor receiving a logical partition power off or a logical partition reboot request from a host processor of a logical partition (step 1000). The service processor retrieves processor ID and partition ID from the request (step 1002). Next, the service processor updates NVRAM processor table, the target address of the host processor whose ID matched with the retrieved ID is set to 0×B00, and the set target is added to 0×A00 for all other processors of the partition (step 1004). Host processors with target address 0×A00 will not try to wake up and resume the execution of the suspended partition manager. Host processors with target 0×B00 will try to detect the suspended partition manager. If the partition manager is indeed suspended, these processors will resume the partition manager. Otherwise, these processors will take the same path as the processors with target address 0×A00. The service processor activates the system reset signal to all processors of the partition (step 1006) with the process terminating thereafter.

Turning next to FIG. 11, a flowchart of a process used for handling a system reset interrupt is depicted in accordance with a preferred embodiment of the present invention. The process illustrated in FIG. 11 may be implemented in a system reset interrupt (SRI) handler for a particular partition.

The process begins with the partition processors receiving a system reset interrupt (step 1100). Next, the processors execute a system reset interrupt (SRI) handler (step 1102). The SRI handler gets the target address from NVRAM processor table (step 1104). This target address is set using the processes described with respect to FIGS. 8–10. A determination is made as to whether the target address equals 0×100 (step 1106). If the target address equals 0×100, control is transferred to the SRI handler of the partition (step 1108). Virtual reset switch action is completed (step 1110) with the process terminating thereafter. The function of the virtual reset button is to invoke the SRI handler of the partition. Once the hypervisor transfers control to the SRI handler of the partition, the SRI handler of the partition will invoke the partition's OS SRI function to take further action.

With reference again to step 1106, if the target address does not equal 0×100, a determination is made as to whether the target address is 0×A00 or 0×B00 (step 1112). This step is used to direct the processors to their specified target address. If the processors obtain the target address 0×A00, these processors will not participate in the competition to wake up the suspended partition manager. The processors will simply inform the hypervisor that they are now back to the hypervisor environment, i.e. setting their state variable in the hypervisor memory to the stopped-state value. The processors will put themselves in the waiting loop. Within the waiting loop, these processors constantly read their uniquely assigned memory locations in the hypervisor area. If the assigned memory location contains a non zero value, then this value is treated as the address of the routine to which the processor will branch. The processor then exits the waiting loop and continues execution beginning at the specified branch address.

If the target address is 0×B00, a determination is made as to whether the partition manager is suspended (step 1114). If the partition manager is suspended, the processors compete to wake up the partition manager (step 1116). In the depicted examples, the partition manager may be implemented using hypervisor 410 in FIG. 4. A determination is made as to whether there is a winning processor (step 1118). If there is a winning processor, the partition manager task is resumed (step 1120) with the process terminating thereafter.

With reference again to step 1114, if the partition manager is not suspended, the processors in the partition go to a stop stopped state and idle in a spinning loop, as described above (step 1122) with the process terminating thereafter. With reference again to step 1118, if there is not a winning processor, the process proceeds to step 1122.

With reference again to step 1112, if the target address is 0×A00, the process then proceeds to step 1122 as described above.

Thus, the present invention provides an improved method, apparatus, and computer implemented instructions for handling requests to turn off logical partitions and/or reboot logical partitions. The mechanism of the present invention provides an ability to reboot or reset processors assigned to a particular logical partition without rebooting or resetting other processors assigned to other logical partitions in the data processing system. This mechanism allows for handling resources for a logical partition individually without affecting other logical partitions.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in for controlling power in a data processing system having a plurality of logical partitions, the method comprising:

responsive to receiving a request to turn off power for a logical partition within the plurality of logical partitions in the data processing system, determining whether an additional partition within the plurality of logical partitions is present in the data processing system;

turning the power off in the data processing system in response to a determination that an additional partition within the plurality of logical partitions is absent in the data processing system; and shutting down the logical partition in response to a determination that an additional partition within the plurality of logical partitions is present in the data processing system.

2. The method of claim 1 further comprising:

disabling a physical power switch in the data processing system.

3. The method of claim 1, wherein the request is received from a remote terminal.

4. The method of claim 1, wherein the request is received by a service processor within the data processing system.

5. The method of claim 1, wherein the request is received by a hypervisor.

6. The method of claim 1, wherein the turning and shutting steps are performed by the hypervisor.

7. A method for rebooting logical partitions in a data processing system, the method comprising:

receiving a request to reboot a logical partition within the plurality of logical partitions; and activating a reset signal only for each processor assigned to the logical partition.

8. The method of claim 7 further comprising:

disabling a reset switch in the data processing system.

9. The method of claim 7, wherein receiving and activating steps are performed by a service processor in the data processing system.

10. The method of claim 7, wherein the request is received by a hypervisor and sent to a service processor to activate the reset signal.

11. A data processing system comprising:

a bus system;

a communications unit connected to the bus system;

a memory connected to the bus system, wherein the memory includes as set of instructions; and a processing unit connected to the bus system, wherein the processing unit executes the set of instructions to determine whether an additional partition within the plurality of logical partitions is present in the data processing system in response to receiving a request to turn off power for a logical partition within the plurality of logical partitions in the data processing system; turn the power off in the data processing system in response to a determination that an additional partition within the plurality of logical partitions is absent in the data processing system; and shut down the logical partition in response to a determination that an additional partition within the plurality of logical partitions is present in the data processing system.

12. A data processing system comprising:

a bus system;

a communications unit connected to the bus system;

a memory connected to the bus system, wherein the memory includes as set of instructions; and a processing unit connected to the bus system, wherein the processing unit executes the set of instructions to receive a request to reboot a logical partition within the plurality of logical partitions; and activate a reset signal only for each processor assigned to the logical partition.

13. A data processing system for controlling power in a data processing system having a plurality of logical partitions, the data processing system comprising:

determining means, responsive to receiving a request to turn off power for a logical partition within the plurality of logical partitions in the data processing system, for determining whether an additional partition within the plurality of logical partitions is present in the data processing system;

turning means for turning the power off in the data processing system in response to a determination that an additional partition within the plurality of logical partitions is absent in the data processing system; and shutting down means for shutting down the logical partition in response to a determination that an additional partition within the plurality of logical partitions is present in the data processing system.

14. The data processing system of claim 13 further comprising:

disabling means for disabling a physical power switch in the data processing system.

15. The data processing system of claim 13, wherein the request is received from a remote terminal.

16. The data processing system of claim 13, wherein the request is received by a service processor within the data processing system.

17. The data processing system of claim 13, wherein the request is received by a hypervisor.

18. The data processing system of claim 13, wherein the turning means and shutting means are located in a hypervisor.

19. A data processing system for rebooting logical partitions in a data processing system, the data processing system comprising:

receiving means for receiving a request to reboot a logical partition within the plurality of logical partitions; and activating means for activating a reset signal only for each processor assigned to the logical partition.

20. The data processing system of claim 19 further comprising:

disabling means for disabling a reset switch in the data processing system.

21. The data processing system of claim 19, wherein receiving means and activating means are located in a set of instructions executed by a service processor in the data processing system.

22. The data processing system of claim 19, wherein the request is received by a hypervisor and sent to a service processor to activate the reset signal.

23. A computer program product in a computer readable medium for controlling power in a data processing system having a plurality of logical partitions, the computer program product comprising:

first instructions, responsive to receiving a request to turn off power for a logical partition within the plurality of logical partitions in the data processing system, for determining whether an additional partition within the plurality of logical partitions is present in the data processing system;

second instructions for turning the power off in the data processing system in response to a determination that an additional partition within the plurality of logical partitions is absent in the data processing system; and third instructions for shutting down the logical partition in response to a determination that an additional partition within the plurality of logical partitions is present in the data processing system.

24. A computer program product in a computer readable medium for rebooting logical partitions in a data processing system, the computer program product comprising:

first instructions for receiving a request to reboot a logical partition within the plurality of logical partitions; and second instructions for activating a reset signal only for each processor assigned to the logical partition.

* * * * *

UNITED STATES PATENT AND TRADEMARK OFFICE
CERTIFICATE OF CORRECTION

PATENT NO. : 6,820,207 B2 Page 1 of 1
DATED : November 16, 2004
INVENTOR(S) : Dawkins et al.

It is certified that error appears in the above-identified patent and that said Letters Patent is hereby corrected as shown below:

Column 3,
Line 52, after "example and" delete "hot" and insert -- not --.

Signed and Sealed this

Twenty-seventh Day of December, 2005

JON W. DUDAS
*Director of the United States Patent and Trademark Office*